United States Patent [19]
Borg et al.

[11] Patent Number: 5,835,898
[45] Date of Patent: Nov. 10, 1998

[54] VISUAL SCHEDULE MANAGEMENT SYSTEM FOR A MANUFACTURING FACILITY

[75] Inventors: William John Borg, Edina; Michael Ludwig Stroeder, Minnetonka, both of Minn.

[73] Assignee: DCD Corporation, Minneapolis, Minn.

[21] Appl. No.: 609,936

[22] Filed: Feb. 29, 1996

[51] Int. Cl.$^6$ .................................................. G06F 9/00
[52] U.S. Cl. .............................. 705/8; 364/188; 345/348
[58] Field of Search ................................ 705/8; 345/440, 345/348, 349, 967, 970, 963, 964; 364/488, 188, 468.05, 468.06, 468.07, 468.08, 468.09

[56] References Cited

U.S. PATENT DOCUMENTS

| | | | |
|---|---|---|---|
| 4,937,743 | 6/1990 | Rassman et al | 364/401 |
| 5,212,791 | 5/1993 | Damian et al. | 395/650 |
| 5,243,531 | 9/1993 | DiPippo et al. | 364/468 |
| 5,255,181 | 10/1993 | Chapman et al. | 364/401 |
| 5,295,062 | 3/1994 | Fukushima | 364/188 |
| 5,414,843 | 5/1995 | Nakamura et al. | 395/600 |
| 5,420,978 | 5/1995 | Tozawa et al. | 395/161 |
| 5,479,343 | 12/1995 | Matoba et al. | 364/401 |
| 5,576,946 | 11/1996 | Bender et al. | 364/146 |
| 5,623,592 | 4/1997 | Carlson et al. | 395/348 |

OTHER PUBLICATIONS

Yurtsever et al., "Equipment Management System (EMS)", IEEE, 1995 IEEE/SEMI Advanced Semiconductor Manufacturing Conference, pp. 248–254, Nov. 13, 1995.

"Gantt Chart", In: *Microsoft Project User's Reference*, Microsoft Corporation, 173–175, (1992).

*Primary Examiner*—Kevin J. Teska
*Assistant Examiner*—Raymond H. Dalziel
*Attorney, Agent, or Firm*—Schwegman, Lundberg, Woessner & Kluth, P.A.

[57] ABSTRACT

A computer-based visual schedule management system that provides visual representations of the amount of work scheduled in a manufacturing facility to both enable rapid identification of bottlenecks in the work flow and permit interactive manipulation of job schedules to alleviate conflicts. The user associates realistic images with the work centers of a facility, lays out the work centers on a visual floorplan of the facility to create a graphical shop overview, and instantly refreshes the utilization of each work center in the shop overview. If changes need to be made, the user selects any work center with a pointing device and drills-down to a graphical representation of a production control board to see the details of the jobs that are scheduled for that work center. The user effects changes by simply dragging the job to a new position on the time grid, or by dragging and dropping the job from the production control board of one work center to the production control board of another. Then, by re-displaying the shop overview, the user quickly assesses the impact of the change on the other work centers and can make further changes to the production control boards of the other work centers if necessary. Thus, the work load of an entire manufacturing facility can be visualized and manipulated interactively in a single computer session without the need for paper reports and off-line analysis, promoting more timely decision-making for better productivity.

20 Claims, 13 Drawing Sheets

VISUAL SCHEDULE MANAGEMENT SYSTEM FOR A MANUFACTURING FACILITY

FIELD OF THE INVENTION

The present invention is related to scheduling software and in particular to visually managing the schedules of jobs in a manufacturing facility.

BACKGROUND OF THE INVENTION

The management staff of a manufacturing organization needs to constantly monitor and evaluate the performance of its machinery and workers by locating scheduling bottlenecks and idle areas. One approach to this goal was to represent the jobs scheduled in the facility through a production control board that consisted of a movable bar for each job positioned on a time grid. However, production control boards were confined to a single location, making them difficult to access from the shop floor, and often failed to reflect the current actual schedules when the sequence of jobs was reordered on the shop floor. Furthermore, the amount of information that can be conveyed by a production control board is limited, and management relied heavily on paper-based reports to supplement the production control boards. While rescheduling a job on the production control board was as simple as moving the bar to a new time, evaluating the impact of this change on other jobs required many hours of analysis to extract the necessary data from the reports. Other paper-based scheduling methodologies such as PERT, GANTT and CPM were also used but again required extensive analysis and were never considered user-friendly.

With the advent of computers, these paper reports and methodologies were transferred to the computer screen. Computer software, such as spreadsheets and project planning applications, allow for faster updating and easier mathematical manipulation of production data. However, since the software only duplicates the paper-based approach, management must continue using the methods it has always employed to evaluate work loads and to make necessary changes.

The current practice of the larger companies in the manufacturing industry is to use one or more computer-generated reports, either on paper or displayed on a monitor, to identify areas in the manufacturing facility where the work load exceeds the available capacity. Additional reports are usually available to further review the detail of the work orders comprising the load. However, if management determines that changes need to be made, those changes cannot be made through the reporting software. Instead, other functions, sometimes computer-based, sometimes not, must be executed to actually effect the desired change. After the change has been made, the reporting software is run again and the process of reviewing the output reports to analyze the results of the changes and determine if further changes need to be made is repeated. This process is particularly time-consuming if the user wants to make a provisional schedule change to the system and evaluate the impact before making the new schedule permanent. In some cases, the awkwardness of the process results in either the job being rescheduled "blind" or not rescheduled at all.

The work flow sequence of existing computer-based manufacturing scheduling systems is identical to that used with paper-based systems with the exception that the mathematical calculations and report production are now performed by a computer. Thus, while the computer has contributed to the decision-making process by producing the reports faster, the subsequent steps of making and evaluating work load modifications have not benefitted from computerization.

Furthermore, smaller companies in the manufacturing industry, the "job shops", still rely on the physical production control boards as the existing software is too difficult to use for the average employee. However, the profitability of the job shops suffers because of the lack of computerization of their work schedules. A typical job shop does not run a standard array of jobs every day, as do the larger manufacturers, but instead is faced with unpredictable work loads which require constant rearrangement of schedules. The need for flexibility is based on the business dynamics dictated by both customers and suppliers. In addition, as the complexity of the jobs performed by the job shop increases, so does the complexity of managing the schedules. Therefore, the job shops could also benefit from a scheduling system that is easy to use and accurately reflects the actual amount of work scheduled to be performed in the facility.

SUMMARY OF THE INVENTION

The visual schedule management system provides graphical representations of the amount of work scheduled in a manufacturing facility to both enable rapid identification of bottlenecks in the work flow and permit interactive and integrated manipulation of job schedules to alleviate conflicts. The system is completely computer-based, from its reporting functions to its rescheduling facility, thus promoting more timely decision-making for better productivity. In addition, the visual schedule management system presents its information to the user in graphical form, making the system easy and intuitive to use.

The visual schedule management system comprises a software program running on a general purpose computer having a central processing unit, a memory, a mass storage device containing a database, a monitor, a user input device, such as a keyboard, and a pointing device, such as a mouse, trackball, or light pen. The software uses a visual user interface to the computer allowing the user to interactively execute the following processes that support the management of work loads on multiple work centers by:

graphically representing the work centers and the work load for each work center of the facility on a shop overview image displayed on a monitor;

graphically representing the jobs scheduled at a selected work center on a production control board image displayed on the monitor, wherein the work center is selected via its graphical representation on the shop overview; and interactively establishing a new schedule for a job by moving the graphical representation of the job to a new position on the production control board.

Each work center is represented in the database by a maximum work load capacity data item equal to a maximum amount of time the work center operates during a unit of time. Each work center is also associated with an image in the database that is used as its graphical representation on the shop overview image. The creation of a shop overview is discussed below.

Each operation in a sequence of operations required to perform a job is represented in the database by a start date data item, an end date data item, a work center data item, and a work load data item equal to an amount of time required to perform the operation at a work center. The start date data item and the end date data item represent the schedule of the operation, and the work center data item represents the work center that is scheduled to perform the operation as determined by the software. The software uses additional data items, such as a what-if start date data item and a what-if end date data item, to represent an operation when needed.

The production control board is a graphical representation of the physical production control boards used by many job shops. The production control board represents the schedule for one work center by displaying tokens located on a time grid corresponding to the operations the work center has in its work queue. The production control board is accessed by the user selecting the graphical representation of the work center on the shop overview with the pointing device.

The token on the production control board is drawn on the monitor as a timebar similar to the bar on the physical production control board. The timebar is positioned on the time grid, as is the physical bar, with one end of the timebar at the start date and time of the operation, and the other end of the timebar on the end date and time. The timebar also visually represents information about the operation, such as the amount of work left to complete the operation and whether the schedule represented by the timebar is a "what-if", or provisional, schedule. The timebars on the production control board are displayed in chronological order based on when the associated operations are scheduled to be performed at the work center.

When the user moves a token on a production control board to a different position on the time grid., the software reschedules the operations associated with the moved token by determining a new start date and a new end date for the operation represented by the moved token and asking the user for confirmation. If the user does not confirm the change, the software moves the token back to its original location. Otherwise the software reschedules some or all other operations in the sequence when indicated by the user. The user also has the option of designating the new schedules as provisional.

The user also uses the production control board to make a what-if schedule into a definite schedule, or to discard the what-if schedule and return to the original schedule.

Furthermore, the system allows the user to reschedule an operation at a different work center when two production control boards are shown on the monitor. The software creates a second production control board in response to the user selecting a second work center and the user "drags-and-drops" the token representing the operation from the first production control board to the second.

When creating a shop overview for a facility in response to user input, the system displays a floorplan image on the monitor that represents the facility, displays icons to represent each work center the user places on the floorplan, and displays a utilization indicator on the floorplan image near each icon. If the user needs to add a new work center to the system, the software associates the new work center with a maximum work load capacity center and with an icon which represents the work center in a shop overview.

After a job has been scheduled for work, the software uses a shop overview to allow the user to view the work load in the facility over a user-defined period of time. The software calculates a work load utilization percentage for each work center by dividing the total work load scheduled on the work center during the time period by the work load capacity of the work center during the time period. The software then marks a portion of each utilization indicator on the shop overview in proportion to the work load utilization percentage for the corresponding work center.

A different version of the software responds to a user's request to locate the work center which is currently working on a specified job by displaying a locator symbol on the shop overview next to the work center. If the user wants to see details about the job, the system displays a production control board showing each operation in the sequence associated with the job as tokens positioned on the time grid when the user selects the locator symbol.

In still another version, the software uses copies of work center icons that the user drags from a shop overview to create the sequence of operations in a job.

The advantage of the visual schedule management system is that it accomplishes all of the report-based tasks of the prior art through on-line, graphical displays and models the methods most job shops use currently. The user associates realistic images with each work center, lays out the work centers on a visual floorplan of the facility, and instantly refreshes the utilization of each work center in the shop overview. If changes need to be made, the user selects any work center and drills-down to the production control board to see the details of the jobs that are scheduled for that work center. The user effects changes by simply dragging the job to a new position on the time grid, or by dragging and dropping the job from the production control board of one work center to the production control board of another. Then, by re-displaying the shop overview, the user quickly assesses the impact of the change on the other work centers and can make further changes to the production control boards of the other work centers if necessary. Thus, the work load of an entire manufacturing facility can be visualized and manipulated interactively in a single computer session without the need for paper reports and off-line analysis. This rapid analysis enables the implementation of "just-in-time" manufacturing methods, increases the facility's profit margin, and enhances customer satisfaction.

BRIEF DESCRIPTION OF THE DRAWINGS

FIG. 2b is a shop overview showing work centers and their associated utilization indicators positioned on the shop floorplan of FIG. 2a.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The visual schedule management system is implemented in software which is installed via removable mass storage media, such as floppy disk or CD-ROM, onto a standard personal computer. The personal computer is configured with a central processor, RAM and ROM memory, a fixed disk mass storage device, a color monitor, a printer, a user input device, such as a standard keyboard, and a pointing device, such as a mouse, trackball, or light pen. Optionally, the visual schedule management system can be installed on a network server running a network operating system, such as Artisoft LANtastic® or Novell Netware®, and accessed by workstations connected to the network.

A preferred embodiment of the visual schedule management system runs as an application under a windowing operating system, such as Microsoft Windows 3.1®, Windows 95®, or Windows NT®, and uses operating system library calls to create its output displays and to process data input from the user through the user input and pointing devices. The data created and used by the visual schedule management system is stored in a relational database, and the management of the data is accomplished by calling the appropriate routines provided by the database software, such as Microsoft FoxPro®. The use of other windowing operating systems and data management systems other than relational databases will be apparent to those skilled in the art.

The visual schedule management system is described below in terms of its use in a manufacturing environment. However, the advantages provided by the system are relevant to any facility that schedules projects to be worked on by more than one person or department. Alternate embodiments of the system applicable to other types of organizations will be apparent to those skilled in the art.

Figure 1:
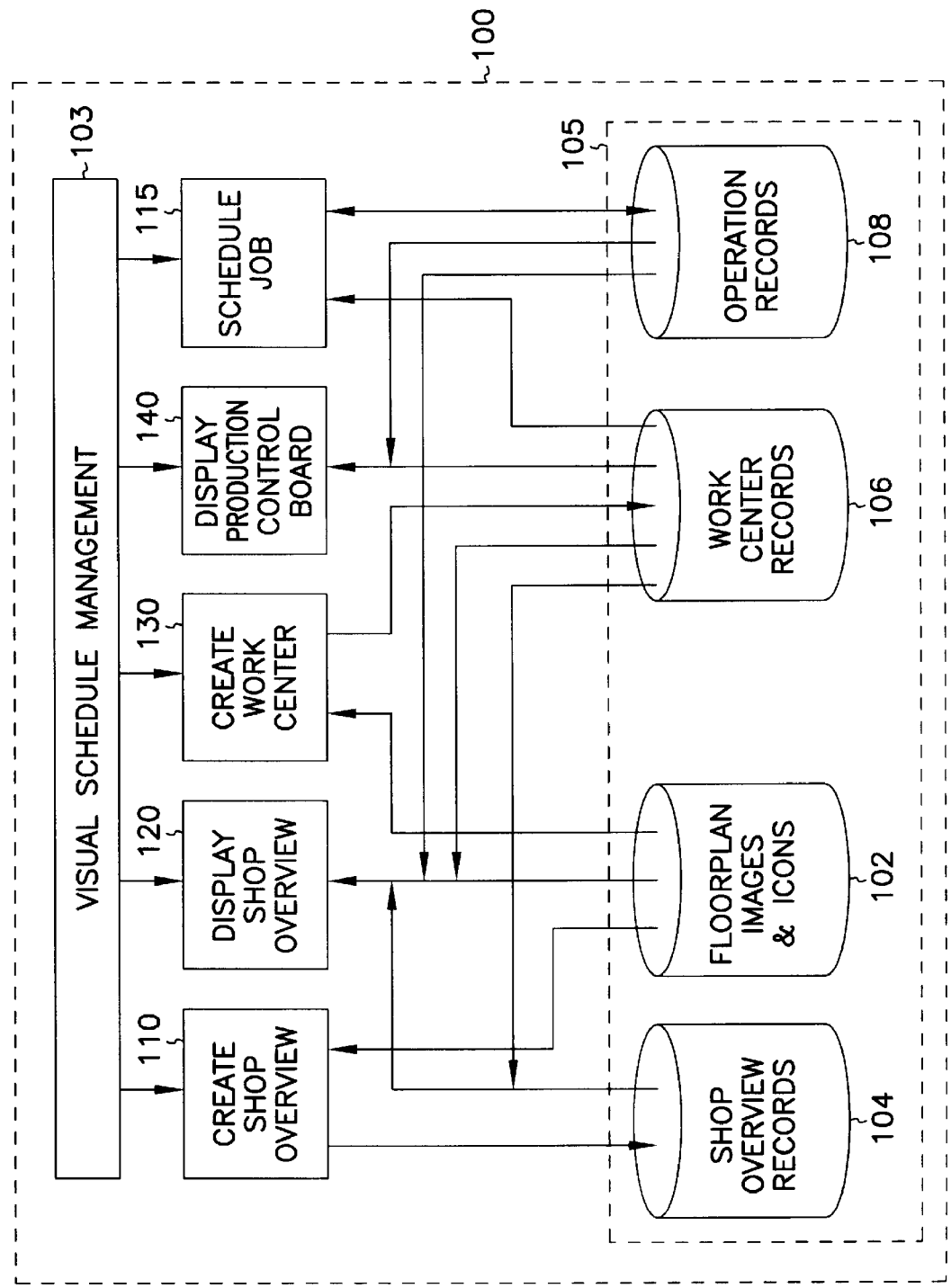
FIG. 1 is a logical block diagram of the software processes and database structures that implement the visual schedule management system.

A logical block diagram of the visual schedule management system 100 comprises a software program 103 that creates and accesses records in a database 105 as shown in FIG. 1. The software program 103 has five main processes: create-shop-overview 110, display-shop-overview 120, create-work-center 130, display-production-control-board 140, and schedule-job 115. The underlying database 105 comprises records for images 102, such as floorplans and icons, shop overviews 104, work centers 106, and operations 108.

The visual schedule management system 100 views a manufacturing facility as a number of "work centers" that work on "jobs". A work center is an area where work is performed within a department of a facility. A group of three lathes, a CAD-CAM workstation, and an inspection area are all examples of work centers. Each work center operates for a maximum number of hours (or minutes or other increment) in a unit period of time, referred to as the "maximum work load capacity" of the work center. A record for each work center containing the work center identifier, description, and the maximum work load capacity is stored in a work center record 106 in the database 105. Also associated with the work center is a pictorial representation of the work center, or "icon", chosen by the user from the image records 102. The user creates new work center records through the create-work-center process 130 by entering work center data, such as work center name, maximum work load capacity, and the picture which represents the work center on the shop overview. Process 130 then stores the information in the work center database record 106.

Figure 2A:
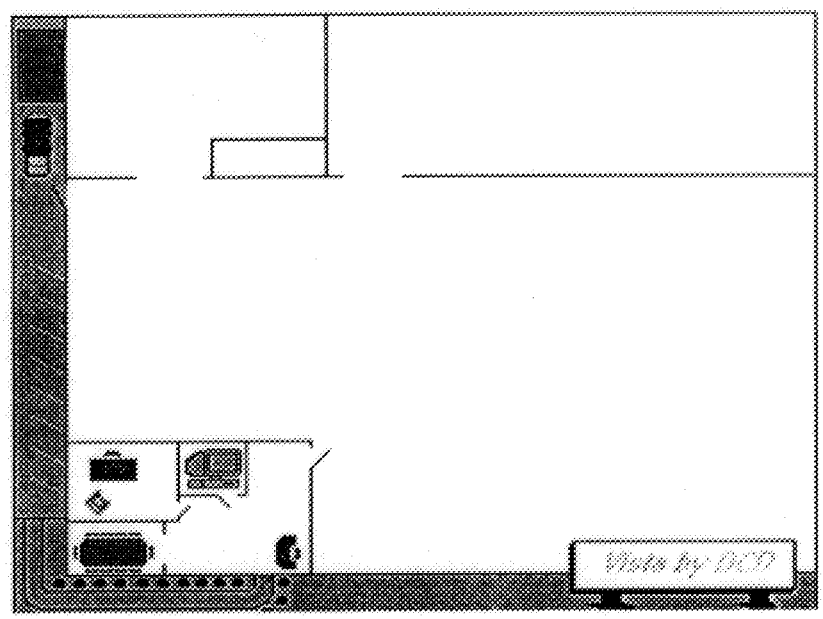
FIG. 2a is a pictorial representation of a shop floorplan for use with a shop overview.
Figure 2B:
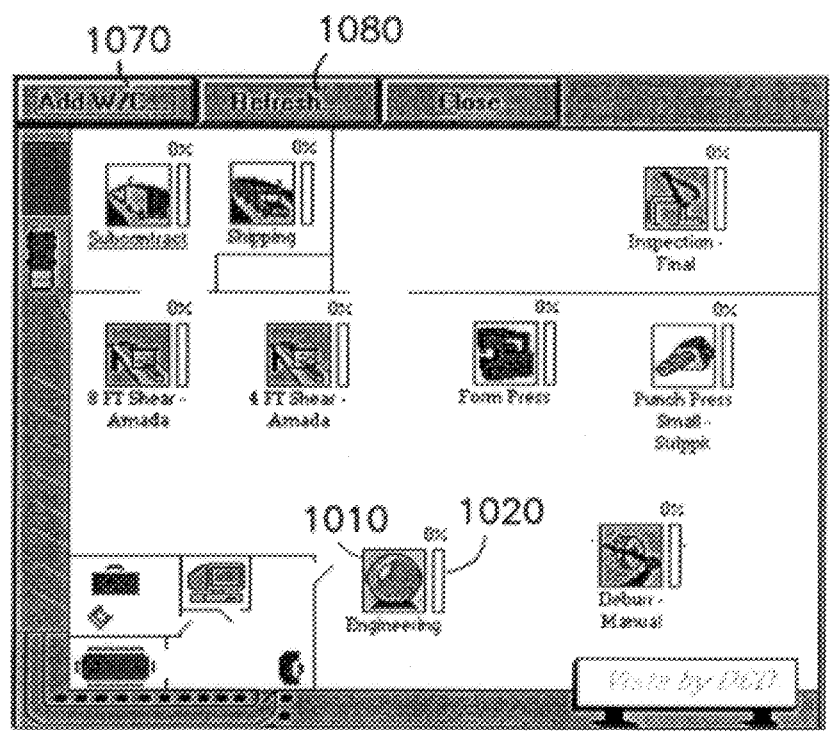
Figure 2C:
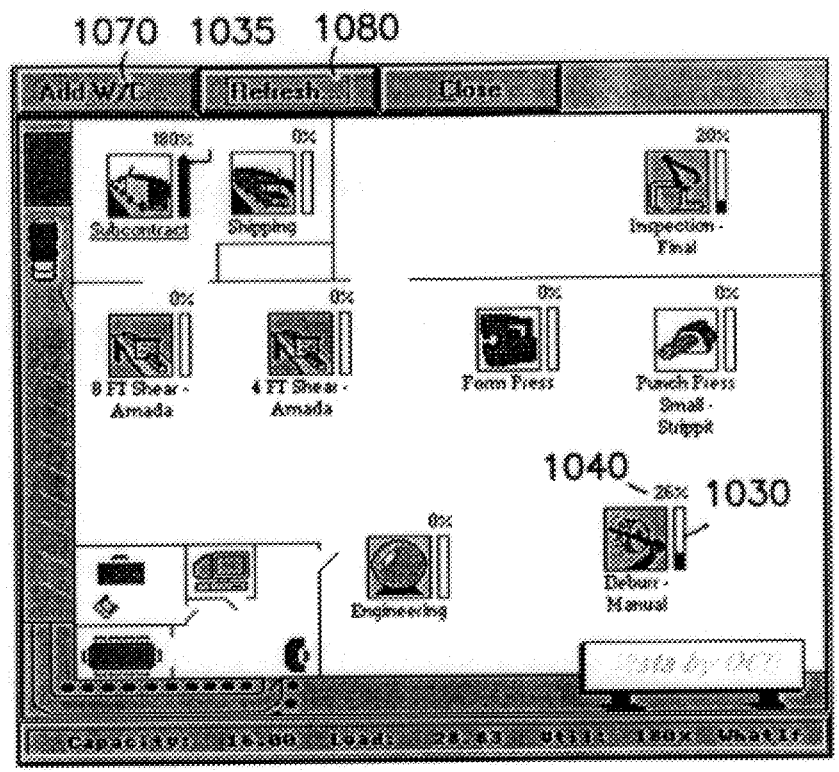
FIG. 2c is the shop overview of FIG. 2b after the visual schedule management system has calculated the utilization percentages for the work centers over a specific time period.

The software program 103 displays the information for the work centers in the facility as graphical images in windows on the computer monitor. FIGS. 2b and 2c show an example of a "shop overview" image which is a pictorial representation of the shop floor. The visual schedule management system 100 uses the shop overview to convey information about the amount of work scheduled at the work centers. The create-shop-overview process 110 creates a shop overview record 106 from user input if an appropriate shop overview is not available in the visual schedule management system 100.

FIG. 2b is an embodiment of a shop overview created by process 110 showing work centers represented by icons 1010. Process 110 also creates a "utilization indicator" 1020 for each work center and positions it on the shop overview near the associated work center. The function of the utilization indicator is explained below. The visual schedule management system 100 supports the creation of multiple shop overviews for a facility so that the amount of work in the facility can be monitored from different management perspectives. For example, the user can create a shop overview showing the entire facility, a shop overview for each department, and a third showing critical work centers.

The visual schedule management system 100 uses the schedule-job process 115 to schedule jobs for work in the facility. Each job comprises a sequence of "operations" (also called "job operations") that are performed to complete the job and an amount of time necessary to complete each operation, i.e. the work load imposed by the operation on the work center performing the operation. Examples of operations for a manufacturing facility include shearing, de-burring, painting, and inspecting. In one embodiment of the visual schedule management system 100, the operations for each job and the work load for each operation are input by the user and stored in an operation database record 108 through a process external to the software program 103. in an alternate embodiment of the software program 103, the user manipulates the work centers shown on the shop overview to interactively create the operation record. This alternate embodiment is further described below.

In order to schedule a job, process 115 calculates a start time and date, and an end time and date for each operation, and assigns a work center to perform the operation. This information is stored in the operation's database record 108. Some or all of the operations of a job can be scheduled on a provisional, or "what-if", basis so that the user can view the impact of the work loads of the operations on the affected work centers before committing to the schedule. A what-if start date, a what-if end date, and a what-if flag are stored in the database records 108 for these operations.

Each operation scheduled to be performed by a work center takes up a portion of the work center's work load capacity equal to the operation's work load during the time period the operation is being performed. The number of hours necessary to complete all the operations scheduled at a work center during a certain period of time is referred to as the work center's "work load". As jobs are scheduled through the facility, the work load on each work center scheduled to work on the operations associated with the jobs increases.

The user executes the display-shop-overview process 120 to view one of the available shop overviews for the facility and examine the "utilization" of each work center associated with the selected shop overview. Utilization is the percentage of the maximum work load capacity of the work center that is taken up by the work loads of operations scheduled on the work center over a given period of time. Thus utilization is a measure of how well a work center is being used. Process 120 retrieves the database records for the shop overview 104, the associated work centers 106, and the operations 108 scheduled for work on the work centers. The utilization is calculated for each work center by dividing the total work load by the work center's work load capacity during a time period. The total work load is determined by adding together all the operations scheduled on the work center during the time period; the work load capacity is determined by multiplying the maximum work load capacity of the work center by the number of units of time in the time period. The result is displayed on the shop overview in the form of a utilization indicator.

In the embodiment shown in FIG. 2c, the utilization indicator for each work center is illustrated as a thermometer 1030 with the amount of "mercury" in the thermometer "tube" proportional to the percent utilization of the work center during a given time period. If the utilization of the work center is greater than 100%, the thermometer is topped off with an upwardly pointing arrow 1035. The utilization percentage value 1040 is also numerically displayed next to the thermometer. The utilization of the work centers are calculated over a specified period of time, known as a "refresh" period. The display-shop-overview process 120 prompts the user to enter the refresh period and also to indicate whether to include the work loads from any what-if schedules in the calculation. Process 120 retrieves information necessary to perform the calculation from the database 105 as described above.

If the user selects a work center icon on the shop overview with the pointing device, the display-shop-overview process 120 shows the work load capacity, the total work load, and the work load utilization percentage of the work center for a period of time in numerical form in a status display portion 1050 of the shop overview as shown in FIG. 2c. If the display-shop-overview process 120 includes work loads of what-if operations in the utilization calculation, the display-shop-overview process 120 so indicates by displaying the word "what-if" in the status display. The display-shop-overview process 120 denotes the selected work center by underlining the work center name on the shop overview as shown with the "Subcontract" work center 1060 in FIG. 2c.

Figure 3:
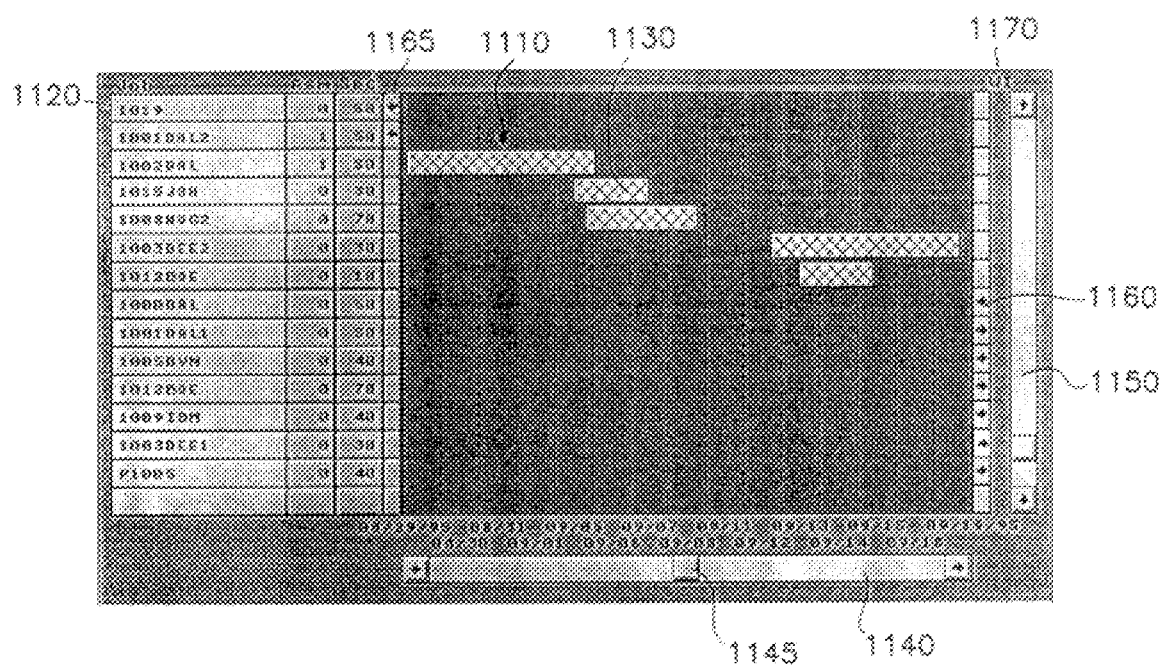
FIG. 3 is a production control board for a work center of FIG. 2 showing operations scheduled for that work center as timebars on a time grid.

Further details of the work load on a work center are visually depicted by the software program 103 on a graphic reproduction of a production control board as shown in FIG. 3. Physical production control boards have been commonly used for scheduling jobs in the manufacturing industry for many years and show each operation of each job scheduled for work in the shop as a moveable rectangular token, or "timebar", positioned on a time grid. Scheduling conflicts could be easily seen and the appropriate timebar was moved on the time grid to reschedule a job and resolve the conflict. The display-production-control-board process 140 replicates the physical production control board on the computer monitor.

Process 140 determines the schedule for a work center from the database records for the work center 106 and the operations 108 scheduled on the work center. The schedules are graphically represented by using rectangular tokens 1110, also called "timebars", drawn on a time grid. The timebar for each operation scheduled for work at the work center is positioned on the time grid so that the beginning of the timebar shows the date and time the work center is scheduled to start work on the operation, and the end of the timebar shows the date and time the work center is scheduled to complete the operation. The length of the timebar shows the amount of time the work center is scheduled to work on the operation and represents the work load of the operation. The name of the job 1120 associated with the operation appears horizontally aligned with the timebar for the operation.

Process 140 uses the appearance of the timebar to visually convey information stored in the operation record 108 about the operation, i.e. its "status". Some of the status data, such as the number of hours the scheduled work center has actually worked on the operation, is entered into the database external to the software program 103. In the embodiment shown in FIG. 3, process 140 designates the uncompleted part of an operation by placing hash marks in a portion of the timebar proportional to the uncompleted work load. The remaining, unhashed portion of the timebar is proportional to the completed work load. An operation which has not been started as of the current date has its timebar completely hashed 1130. If the operation record 108 contains a what-if flag, the provisional nature of the schedule is visually indicated by coloring the operation's timebar differently from a default color that designates a definitely scheduled operation.

Again referring to the embodiment illustrated in FIG. 3, process 140 initially displays the job associated with the oldest operation that is incomplete as of the current date at the top of the production control board, and positions the time grid at the scheduled start date and time of that operation. Other scheduled, but uncompleted, jobs are listed in order of the scheduled start dates and times of their incomplete operations on the work center. As only a finite period of time can be shown on the time grid because of the window's size on the monitor, process 140 provides features that permit the user to display other time periods. A horizontal scroll bar 1140 shown at the bottom of FIG. 3 moves the time grid forward and backward in time increments when the pointing device moves a lozenge 1145 (known in the art as a "thumb") along the scroll bar. Often there are more operations scheduled for the work center than can be shown on the production control board due to the size of the window. Therefore, process 140 provides a vertical scroll bar 1150 to allow the user to move through the list of jobs and display the names of additional jobs having operations scheduled on the work center.

FIG. 3 also shows forward 1160 and backward 1165 pointing arrows vertically arranged at the right and left sides of the time grid. If the job name is shown in the window but the timebar is not, the user can use the pointing device to select the arrow horizontally aligned with the job name and process 140 will instantly move the time grid to the time period when the operation is scheduled. Furthermore, the production control board has a column labeled "WI" 1170 located to the right of the time grid as shown in FIG. 3. Process 140 places a symbol in this column to indicate that the job horizontally aligned with the symbol has an operation scheduled on the work center on a provisional basis. This additional what-if indicator is useful if the job name is displayed but the operation's timebar with its distinct what-if coloring is not visible.

The visual schedule management system 100 enables the user to visually reschedule an operation through the production control board. The user "drags-anddrops" the operation's timebar onto a new position on the time grid and process 140 interfaces with the schedule-job process 115 to determine new schedules for the changed operation and the other operations in the job sequence. Process 140 also enables the user to visually reschedule the operation to a different work center by creating a production control board for the second work center so that the user drags the timebar from the first production control board and drops it on the desired date and time on the time grid of the second production control board.

Figure 4:
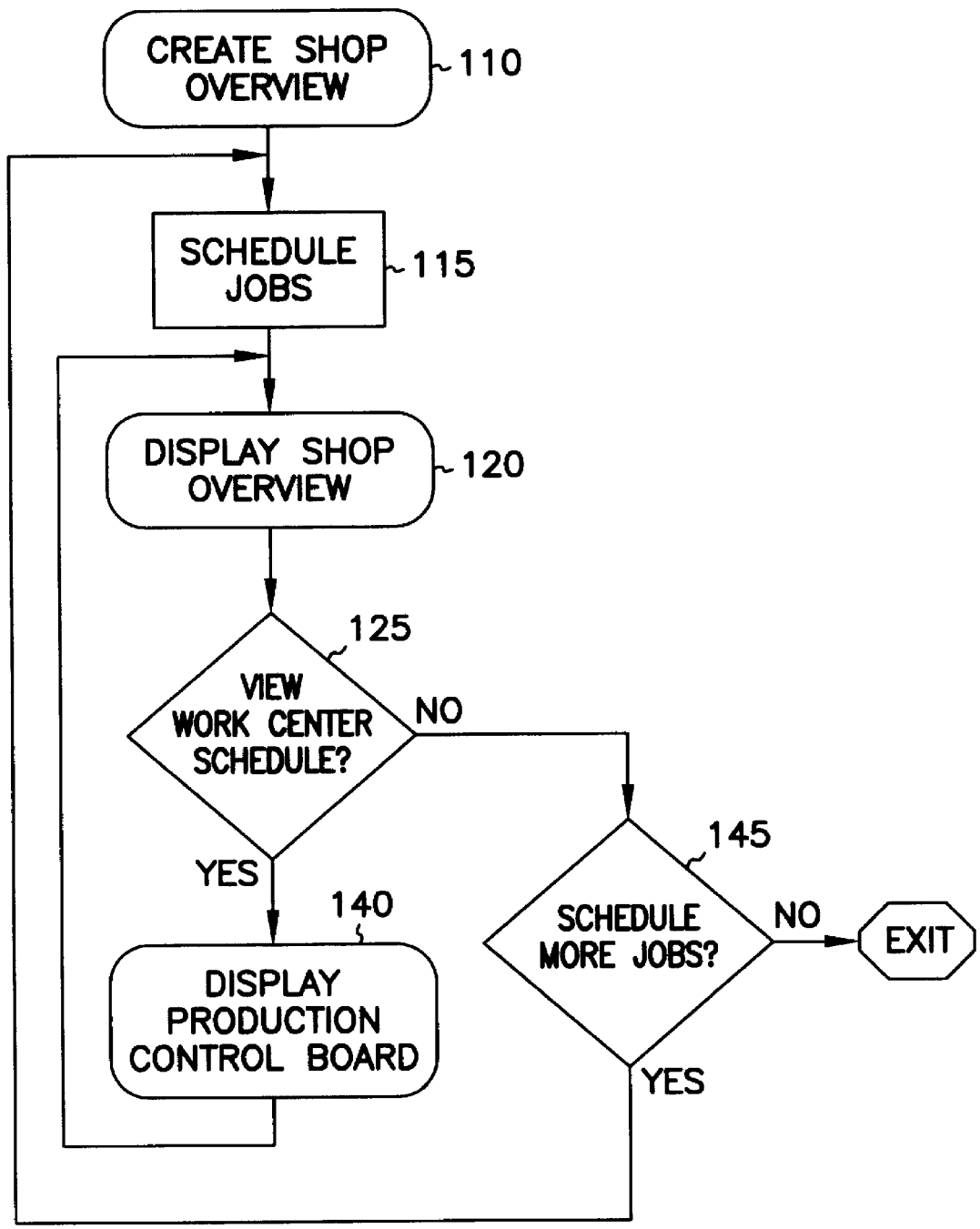
FIG. 4 is a high level work flow diagram illustrating a typical order in which a user executes the processes of the visual schedule management system.
Figure 5:
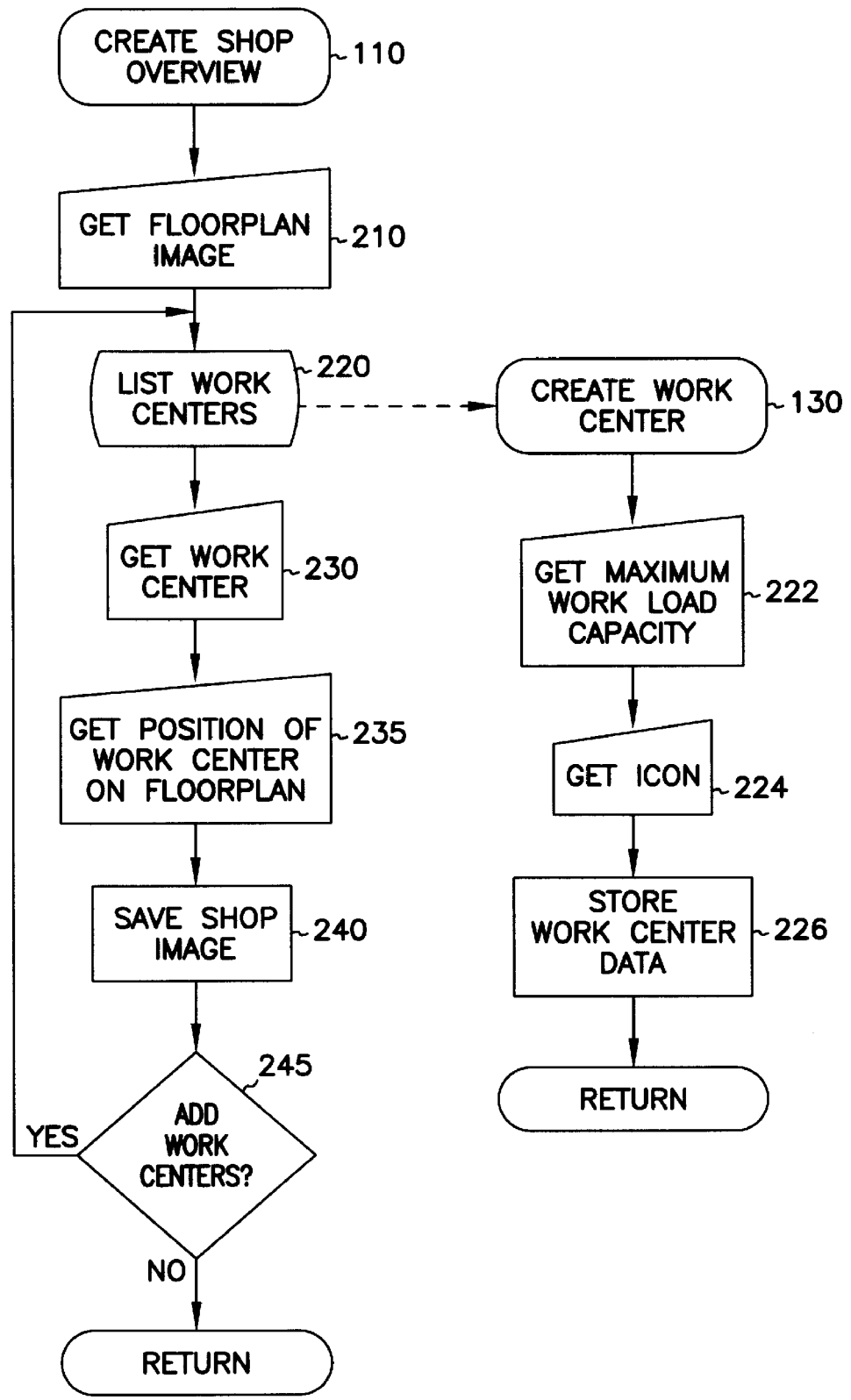
FIG. 5 is a detailed work flow diagram illustrating the functional steps to interactively create a shop overview in the visual schedule management system.
Figure 6:
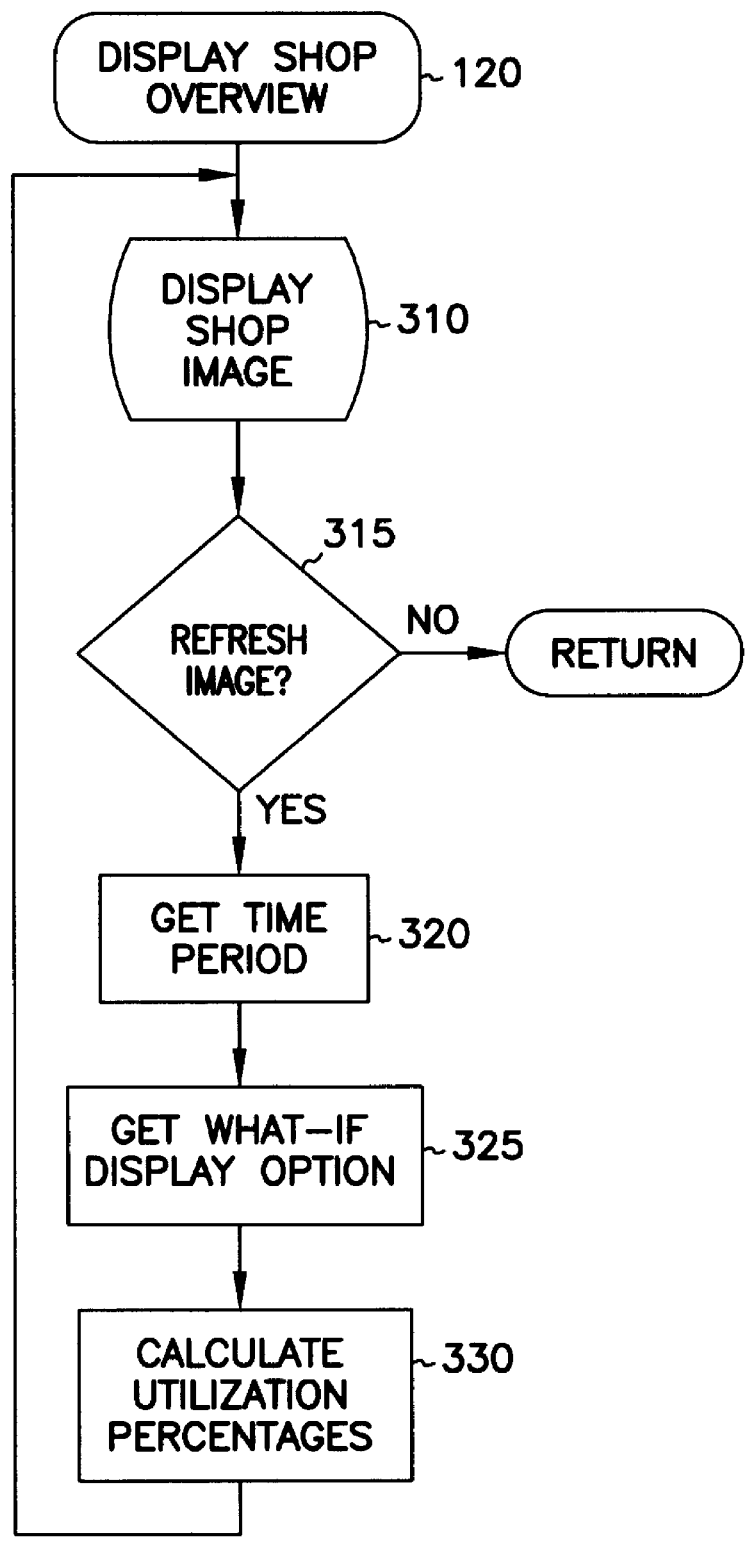
FIG. 6 is a detailed work flow diagram illustrating the functional steps to display the shop overview on a computer monitor.
Figure 7A:
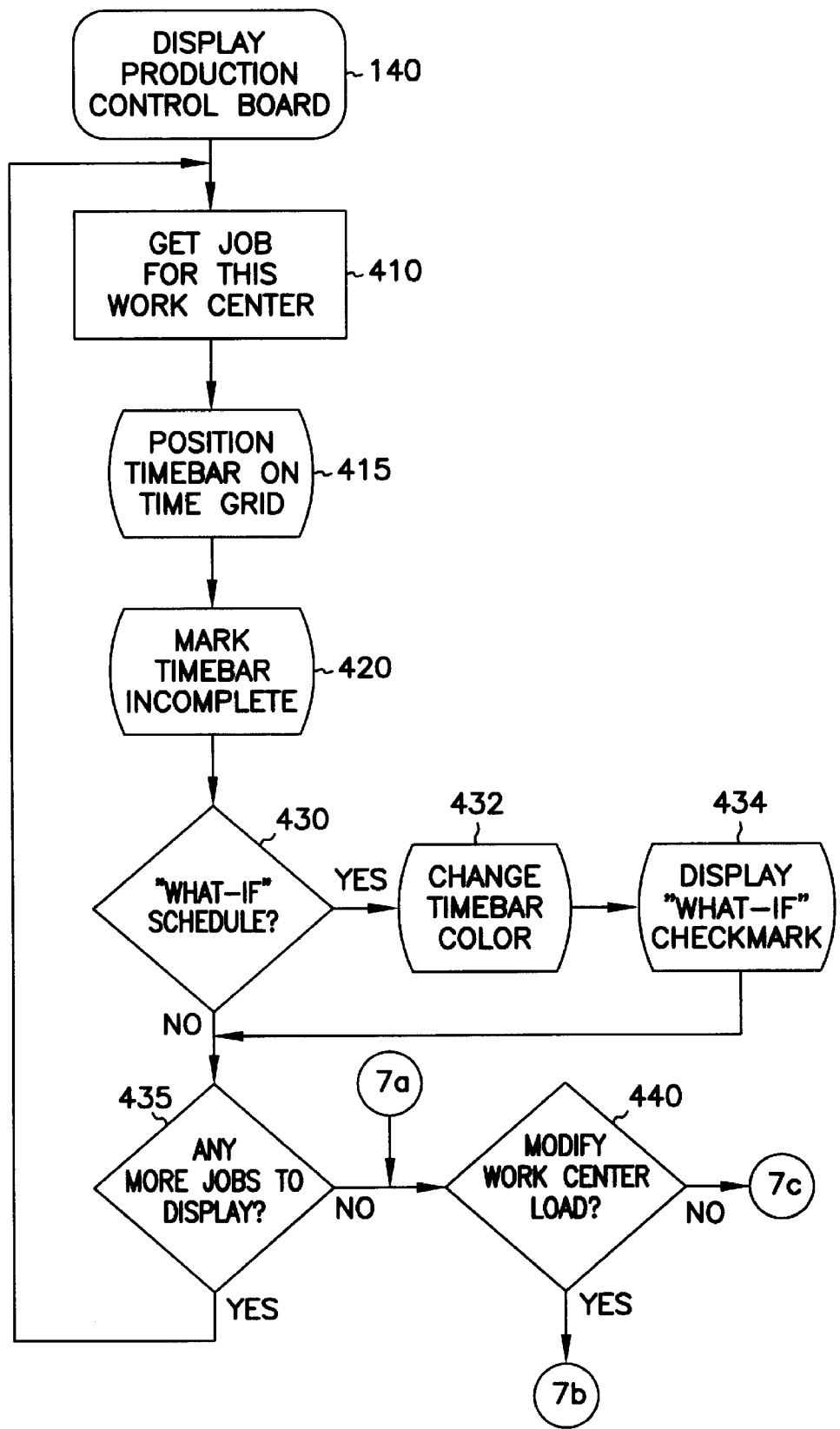
FIG. 7a is a detailed work flow diagram illustrating the functional steps to display a production control board on a computer monitor.
Figure 7B:
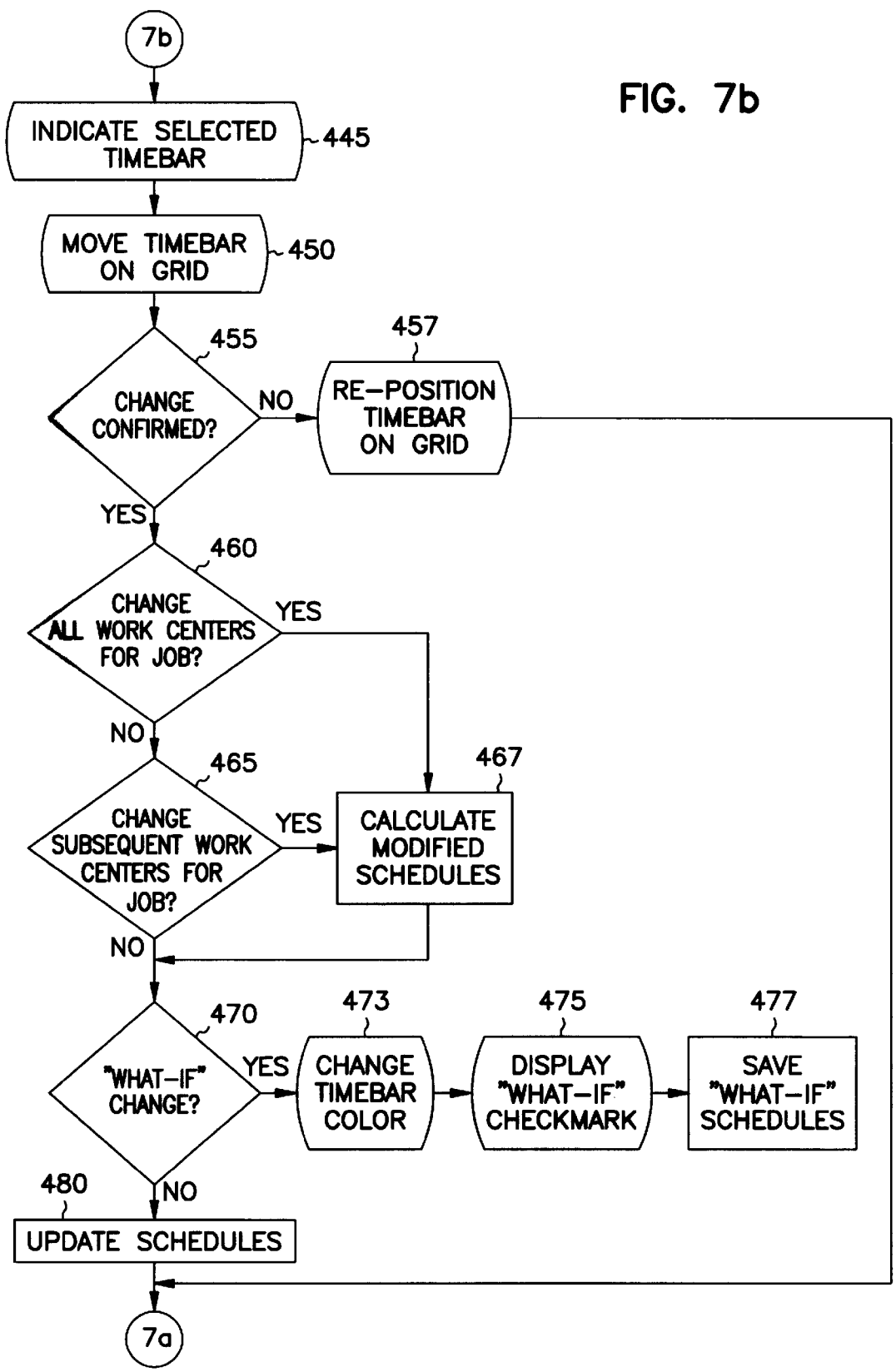
FIG. 7b is a detailed work flow diagram illustrating the functional steps to interactively modify schedules by moving timebars on a production control board.
Figure 7C:
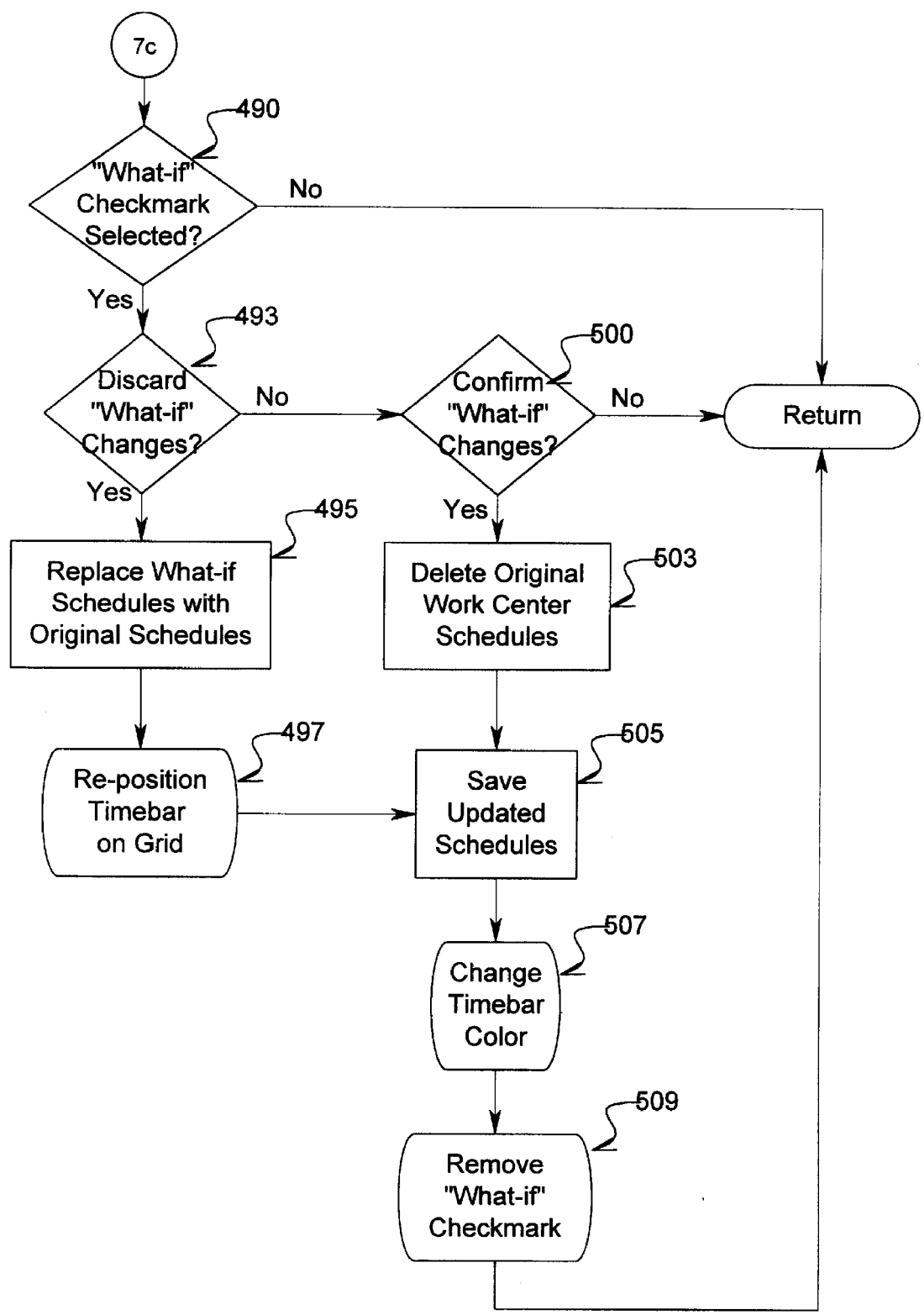
FIG. 7c is a detailed work flow diagram illustrating the functional steps to interactively apply or discard provisional schedules.

One embodiment of the visual schedule management system 100 is described in detail with reference to FIGS. 4, 5, 6, and 7a, 7b, and 7c. FIG. 4 is an overview illustration of a typical sequence in which the user executes the processes 110, 115, 120 and 140. FIG. 5 shows the details of the create-shop-overview process 110, including creating a work center through process 130, if necessary. FIG. 6 shows the steps of the display-shop-overview process 120; FIGS. 7a, 7b, and 7c, show the details of the display-production-board process 140. The calculations of the schedule-job process 115 are described where used. Because the visual schedule management system is interactive, these Figures depict user interactions, as well as the software processes, as functional blocks. In addition, as in any interactive system, the user is not constrained to execute the processes of the visual schedule management system in the exact order shown but may reorder his or her work flow through the system to accommodate his or her needs. However, some functional blocks illustrated in these Figures are prerequisites to other blocks and are indicated as such in the description. The main functional block that represents each process in FIGS. 4, 5, 6, and 7a has the same number as the number of the process in FIGS. 1 and 4.

To enable visual scheduling, at least one shop overview to represent the facility must exist. The user creates a shop overview through the create-shop-overview process 110 shown at function block 110 shown in FIG. 4. After the shop overview has been created, the user accesses the schedule-job process 115, represented by process block 115, to schedule a job for work in the facility. The user then re-displays the shop overview using the display-shop-overview process 120 at function block 120 to see the utilization of the work centers as a result of scheduling the job. Next, the user decides whether to view a production control board that shows details of the work load for one work center at decision block 125.

If the user needs to see the work load details for a work center, he or she "double-clicks" the pointing device on the work center's icon on the shop overview to execute the display-production-control-board process 140 at function block 140. After examining the timebars of the operations scheduled at the work center, the user can reschedule an operation to lessen the work load of the work center during the period of time in which the operation is scheduled to be performed. If the user so indicates, other operations associated with the rescheduled operation are recalculated by the schedule-job process 117 as part of process 140.

Once the work load has been rescheduled, the user re-displays the shop overview through process 120 at function block 120 to see the impact of the changes on other work centers in the facility. A more detailed analysis of the impact is available by accessing the production control boards of the affected work centers by double-clicking on their icons on the shop overview. Thus, the impact of the change on the entire facility can be determined and manipulated visually using only the shop overview and the production control boards.

If the user is satisfied with the utilizations shown by the shop overview and does not want to see details, he or she can choose to schedule more jobs at decision block 145 and branch back to the schedule-job process 115 at block 115. Alternatively, the user can exit the visual schedule management system.

FIG. 5 represents the functional steps performed when creating a shop overview through process 110. Process 110 prompts the user to choose a floorplan image to represent the job shop from the image records 102 at image block 210. FIG. 2a is an example of such a floorplan image. The user clicks the pointing device on the "Add W/C" button 1070 on the shop overview window shown in FIG. 2b to see a list of work centers to choose from (display block 220)

If a particular work center necessary for the shop overview does not have a record in the work center database 106, the user creates it by branching from the create-shop-overview process 110 to the create-work-center process 130. He or she enters the work center data at input block 222 and chooses an icon from the list of icons in the image records 102 to visually represent the work center at input block 224. Process 130 then stores the work center information in database record 106 at update block 226. The user now returns to the create-shop-overview process 110 at block 220 and re-displays the list of work centers.

When the user chooses a work center from the list at input block 220, the create-shop-overview process 110 retrieves the work center record 106 and positions the work center icon on the shop overview floorplan at a default location at block 230. The create-shop-overview process 110 also positions a utilization indicator adjacent to the icon on the floorplan (also at block 230). The user then uses the pointing device to drag-arid-drop the icon, along with its associated utilization indicator, to a new location on the floorplan image that represents its proper place in the job shop at input block 235. The location coordinate information of the icon on the floorplan image is passed from the pointing device to the create-shop-overview process 110. Process 110 creates a shop overview database record 104 and stores the other shop overview information at update block 240.

If additional work centers remain to be added to the shop overview the user branches from decision block 245 and repeats the functional step in FIG. 5 starting with decision block 220. If the shop overview is complete, the user is ready to schedule jobs through the facility and returns to the flow chart of FIG. 1 at process block 115 to execute the schedule-job process 115. FIG. 2b illustrates a completed shop overview showing the work centers and their associated utilization indicators. The utilization indicators are blank in FIG. 2b because no jobs have yet been scheduled through the facility.

As jobs are scheduled by the process 115, the newly-scheduled work loads increase the utilization percentage of the various work centers. The user displays a shop overview to examine the utilization percentages of all the work centers represented on that shop overview using the functional steps illustrated in FIG. 6.

At output block 310, the display-shop-overview process 120 displays a shop overview chosen from the list of shop overviews in the database 104. Initially, the utilization indicators for the work centers are blank until the user chooses the "Refresh" button 1080 on the shop overview window shown in FIG. 2b at decision block 315. The display-shop-overview process 120 requests a refresh time period from the user at block 320 and also determines whether or not to include the work loads from any what-if schedules in the calculation at block 325 based on the state (on or off) of a "show-what-if" option set by the user. If desired, the user can elect to use default values for the refresh time period. A refresh operation using the initial, system-supplied default time period shows the utilization of all work centers having work through the current date. Alternatively, if the user has previously performed a refresh operation during this visual scheduling session, the default time period is that of the previous refresh operation.

Process 120 retrieves the maximum work center capacity from each work center's database record 106 and the work loads from the database records 108 of all the operations scheduled on each work center to perform the calculation as described above. After the utilization calculation is complete, the display-shop-overview process 120 re-displays the shop overview (output block 310). The utilization indicators now show the utilization percentage of each work center on the shop overview image as illustrated in FIG. 2c. The display-shop-overview process 120 also displays the percentage value next to the utilization indicator and in the status bar, along with other information as described above. If the user so desires, he or she can request another refresh operation using a different time period, and the display-shop-overview process 120 repeats the functional steps shown in blocks 320, 325, 330, and 310. Otherwise, the software program 103 returns to the work flow shown in FIG. 4 at decision block 125.

The user next displays the production control board for a work center by "double-clicking" the pointing device on the work center icon shown on the shop overview. The software program 103 then executes the display-production-control-board process 140 as illustrated in the functional steps shown in FIGS. 7a, 7b and 7c.

Beginning at process block 410 of FIG. 7a, the display-production-control-board process 140 creates the production control board time grid, scroll bars, and arrow and then retrieves the database record 105 for an operation scheduled on the work center at block 410. Then the display-production-control-board process 140 creates a timebar with a sculptured, raised appearance for the operation, determines the position of the timebar on the time grid based on the scheduled start and end dates and times of the operation, and displays the timebar on the production control board at display block 415.

The display-production-control-board process 140 changes the appearance of the time bar and the production control board at blocks 420, 430, 432 and 434 to visually indicate the status of the operation as stored in the operation's database record 108. The work flow through the functional blocks of FIG. 7a repeats for each operation for each job scheduled at the chosen work center until all such operations have been processed and the complete production control board has been displayed.

After examining the production control board, the user may be satisfied with the work load distribution for the selected work center. If so, the user executes the functional steps illustrated in FIG. 7c and discussed below. However, if the user wants to manually manipulate the schedule for the selected work center, he or she takes branch 7b of decision block 440 and continues the work flow as shown in FIG. 7b.

The user clicks the pointing device on the timebar of the operation he or she wants to manually reschedule and the display-production-control-board process 140 provides visual feedback to the user by changing the image of the timebar to appear indented at output block 445. The user then uses the pointing device to drag the timebar to a new time and/or date on the time grid to reschedule the operation at input block 450. Alternatively, the user can drag-and-drop the timebar onto the production control board of another work center created by the display-production-control-board process 140. Process 140 determines the new start and end dates and times for the changed operation from the coordinates of the new location of the timebar, presents the new schedule in numeric form, and requests the user cancel or accept the change at decision block 455 by choosing a cancel-new-schedule option or an accept-new schedule option. If the user cancels the change, the display-production-control-board process 140 re-positions the timebar in its original location on the time grid at output block 457 and returns to the work flow of FIG. 7a at decision block 440.

However, if the user confirms the change, the display-production-control-board process 140 requests instructions on propagating the schedule change to the other operations in the sequence that are scheduled at other work centers. The user is presented with three choices:

1. reschedule all the operations in the sequence (block 460: reschedule-all-operations option),
2. reschedule operations scheduled to be performed after the changed operation (block 465: reschedule-subsequent-operations option), or
3. reschedule none of the other operations.

If the user chooses either option 1 or 2, the display-production-control-board process 140 interfaces with the schedule-job process 115 which calculates the new schedule for the selected operations at process block 467. If the user chooses option 3, no changes are made to the schedules of the operations at the other work centers.

The user is also given the option of making the new schedule provisional at decision block 470 so that the display-production-control-board process 140 can revert to the original schedule if the user requests as described below. If the user chooses a reschedule-as-what-if option, the display-production-control-board process 140 provides the user with the visual cues described above to alert the user that the operation is scheduled on a provisional basis at blocks 473 and 477. The display-production-control-board process 140 designates the new schedule as what-if start and end dates at process block 477 while retaining the original schedule. If the schedule is not provisional (the reschedule-as-what-if option is not chosen), the new start and end dates replace the original schedule. All changes are written to the operations' database records 108 at block 480. The display-production-control-board process 140 returns to the work flow in FIG. 7a at decision block 440 where additional modifications to the production control board can be entered into the visual schedule management system 100.

After the user has finished modifying the operations on the production control board and has evaluated the impact of the schedule changes on the facility, he or she can change the status of what-if schedules as illustrated in FIG. 7c. If the user "double-clicks" the pointing device on a what-if symbol, a checkmark in this embodiment, displayed on the production control board, the display-production-control-board process 140 asks the user to decide whether to make the what-if schedule definite. The user can discard the what-if schedule at block 493 (discard-what-if option), confirm the what-if schedule at block 500 (confirm-what-if option), or cancel and leave the what-if schedule unchanged.

If the user chooses to discard the what-if schedule, the display-production-control-board process 140 uses the original schedules from the affected operations' database records 108 at block 495 to reposition their timebars on the time grids of the open production control boards in their original locations at functional block 497; the what-if dates are deleted. Alternatively, if the user chooses to confirm the what-if schedule, the display-production-control-board process 140 deletes the original schedule by overwriting it with the what-if schedule at block 503.

In either case, the display-production-control-board process 140 next saves the updated schedule information to the operations' database records 108 (block 505), returns the timebar to the default color, and deletes the what-if checkmarks from the open production control boards.

If the user has chosen to cancel, or after the display-production-control-board process 140 has executed functional block 509, the visual schedule management system returns to the display-shop-overview process 120 at block 120 in FIG. 4. The display-shop-overview process 120 shows any modification to the schedule of a work center as a change in its associated utilization indicator on the shop overview image when a refresh operation covering the scheduled time period is performed.

Figure 8:
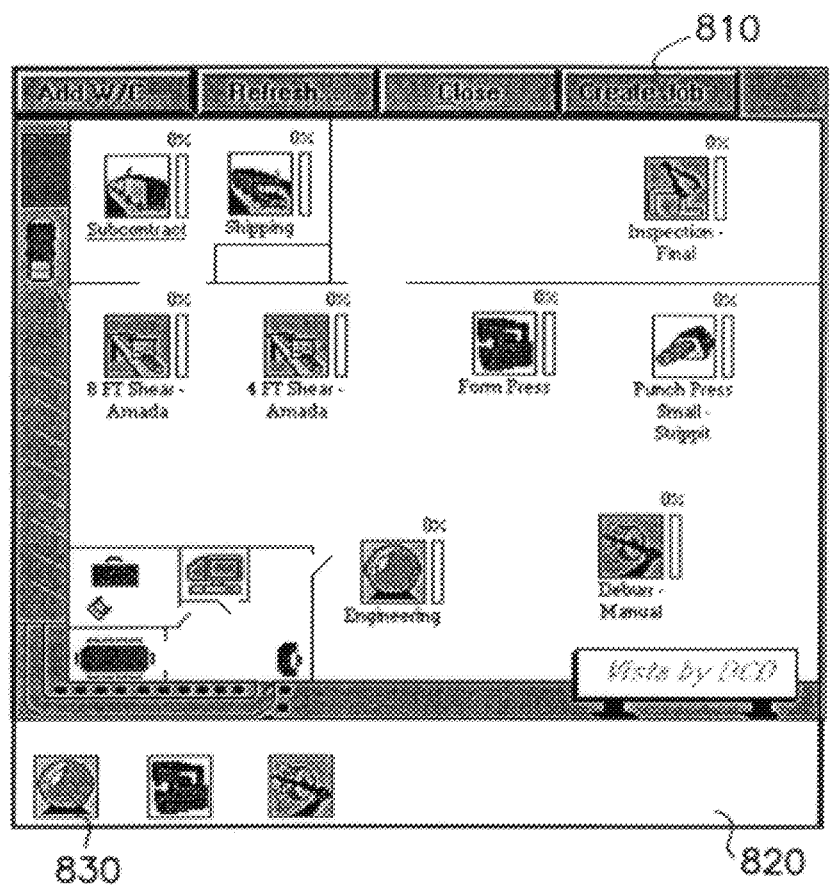
FIG. 8 is a shop overview in an alternate embodiment of the invention showing a visual method of creating a job.

In an alternate embodiment shown in FIG. 8, the sequence of operations associated with a job is created interactively by the user. The software program 103 places a "Create Job" button 810 on the shop overview and designates a "job detail" area 820 on the monitor when the user selects the button. The user inputs basic job information, such as job name, identifier, customer name, to the software program 103 through the user input device. Next the user selects one of the work centers displayed on the shop overview with the pointing device and the software program 103 makes a copy of the work center icon 830 which the user drags out of the shop overview window and drops in the job detail area 820. The icon in the job detail area 820 represents an operation. The software program 103 prompts the user for information about the operation, such as its work load. After the user has created all the operations for the job in this fashion, the software program 103 determines the sequence in which the operations are performed by the arrangement of the icons in the job detail area 820 and creates a record 108 with the data for each operation in the database 107.

Figure 9:
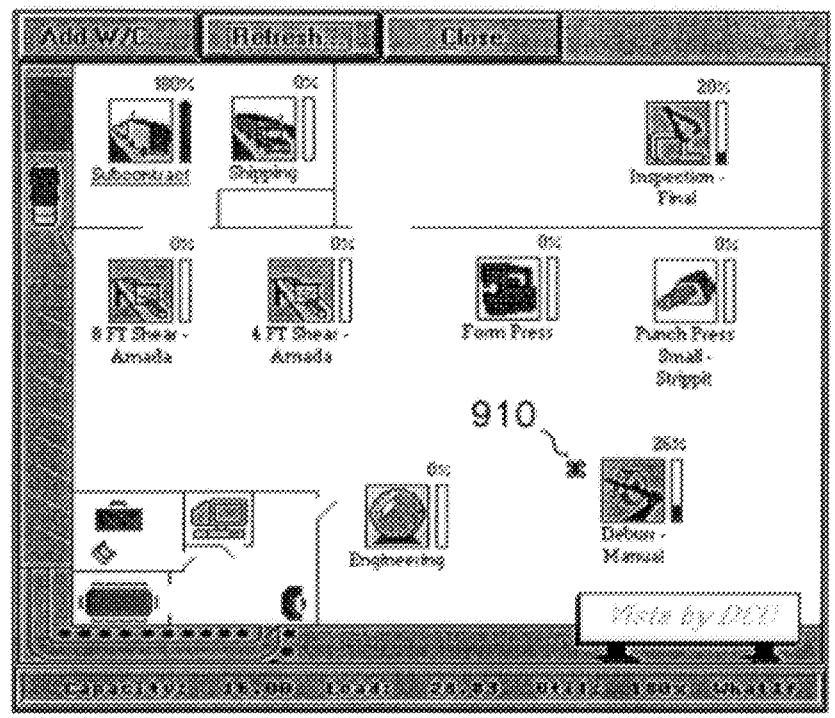
FIG. 9 is a shop overview in an alternate embodiment of the invention showing a locator symbol next to a work center.

In still another alternate embodiment shown in FIG. 9, the display-shop-overview process 120 creates a locator symbol 910 on the shop overview when the user requests that the system locate the work center working on a particular job on the current date. The locator symbol 910 is positioned next to the work center. The user can then view all the operations associated with the job by double-clicking the pointing device on the locator symbol 910 and the display-production-control-board process 140 displays a job production control board. Unlike the previously described production control board that shows the operations scheduled at a selected work center, the production control board in this alternate embodiment shows all the operations associated with the job listed by work center. The user is able to reschedule an operation by moving a token representing the operation as before, but now is able to immediately view the impact on all the operations for the job in a single window.

In a further alternate embodiment, an operation can be associated with an instructional image stored in the database 107, such as a video or part diagram, that teaches an operator at the scheduled work center how to perform the operation. Such instruction images are useful for new or complex operations that are seldom performed and therefore easily mishandled.

The visual schedule management system permits the managers of a manufacturing facility to view the load and capacity of every work center, or a selected subset, in the shop for a specified period of time through the shop overview feature. If, as result of using shop overview, a manager discovers a potential bottleneck, he or she can immediately see the details of the jobs and reschedule the conflicts to ensure better utilization of the facility. The visual schedule management system enables visualization and interactive control of manufacturing work loads by uniquely combining pictorial representations of the shop facility and job schedules with the drag-and-drop capabilities of a windowing operating system.

The processes shown in FIG. 1, and the functional blocks shown in FIGS. 4, 5, 6, and 7a, 7b, and 7c, do not necessarily correspond to actual modules, subroutines, or function calls in the software program that implements the visual schedule management system. Furthermore, the database records illustrated in FIG. 1 and the descriptions given above are generic in nature. Therefore, neither the description of the processes nor the structure of the database as described should be read as limiting the scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of scheduling jobs and managing work loads on multiple work centers in a manufacturing facility through a visual user interface to a general purpose computer, the method comprising the steps of:

graphically representing the work centers and the work load for each work center of the facility on a shop overview image displayed on a monitor;

graphically representing the jobs scheduled at a selected work center on a production control board image displayed on the monitor, wherein the work center is selected via its graphical representation on the shop overview; and interactively establishing a new schedule for a job by moving the graphical representation of the job to a new position on the production control board.

2. A method of scheduling jobs and managing work loads on multiple work centers in a manufacturing facility through a visual user interface to a general purpose computer having a database, wherein each work center is represented in the database by a maximum work load capacity data item equal to a maximum amount of time the work center operates during a unit of time, and each operation in a sequence of operations required to perform a job is represented in the database by a start date data item, an end date data item, a work center data item, and a work load data item equal to an amount of time required to perform the operation at a work center, the method comprising the steps of:

creating a shop overview, wherein the work centers in the facility and a work load utilization percentage for each work center are represented graphically on a monitor;

determining a start date, an end date, and a work center for each operation in a sequence, wherein the start date data item, the end date data item and the work center data item are equated to the start date, the end date and the work center respectively for each operation to represent the schedule of the operation in the database;

graphically displaying the work load utilization percentage for each work center represented on the shop overview on the monitor, wherein the work load utilization percentage is calculated over a refresh time period;

graphically displaying a production control board on the monitor in response to the pointing device selecting the graphical representation of a work center on the shop overview, wherein the schedule of each operation on the selected work center is represented by a token located at a first position on a time grid portion of the production control board; and determining a new start date and a new end date for an operation based on the pointing device moving the token representing the operation to a second position on the time grid to change the schedule of the operation.

3. The method of claim 2, wherein the shop overview comprises a floorplan image and a coordinate value relative to the floorplan image for each graphical representation of a work center displayed on the shop overview.

4. The method of claim 2, wherein the graphical representation of a work center is an icon.

5. The method of claim 2, wherein graphically displaying the work load utilization percentage comprises the steps of:

obtaining the refresh time period from a user input device;

calculating a total work load for each work center by summing the work load data items associated with a work center data item representing a work center that is graphically represented on the shop overview and further associated with a start date data item or an end date data item within the refresh time period;

calculating a work load capacity of each work center over the refresh time period by multiplying the maximum work load capacity data item representing a work center that is graphically represented on the shop overview by the number of units of time in the refresh time period; and dividing the total work load by the work load capacity calculated for each work center that is graphically represented on the shop overview; and graphically displaying a utilization indicator on the shop overview on the monitor for each work center that is graphically represented on the shop view, wherein a portion of the utilization indicator proportional to the work load utilization percentage is visually differentiated.

6. The method of claim 5, wherein the total work load includes work load data items representing operations associated with a what-if flag in the database are included in the total when the pointing device toggles a show-what-if option on.

7. The method of claim 5, wherein the total work load does not include work load data items representing operations associated with a what-if flag in the database when the pointing device toggles a show-what-if option off.

8. The method of claim 5, further comprising the steps of:

numerically displaying the work load utilization percentage for each work center that is graphically represented on the shop overview; and numerically displaying the work load capacity, the total work load, and the work load utilization percentage for a work center for the refresh time period in response to the pointing device selecting the graphical representation of the work center on the shop overview.

9. The method of claim 2, wherein the token representing the operation is a rectangular timebar comprising a first end positioned on the time grid at the start date represented by the start date data item for the operation, a second end positioned at the end date represented by the end date data item for the operation, and a length visually delineated between the first end and the second end.

10. The method of claim 9, wherein the length of the timebar is divided into a first portion representing a completed proportion of the work load data item and a second portion representing an uncompleted proportion of the work load data item for the operation.

11. The method of claim 10, wherein the second portion of the timebar is visually differentiated from the first portion.

12. The method of claim 9, wherein the length of the timebar is painted a color different from a default color when the operation represented by the timebar is associated with a what-if flag in the database.

13. The method of claim 2, wherein the production control board comprises a first production control board for a first selected work center and a second production control board for a second selected work center, and moving a token from the first production control board to the second production control board changes the work center data item for the operation represented by the token to represent the second selected work center, and the start date data item and the end date data item for the operation are equated to a new start date and a new end date represented by the position of the token on the time grid of the second production control board.

14. The method of claim 2, wherein the step of determining a new start date and a new end date comprises the steps of:

numerically displaying a new start date and a new end date represented by the second position on the monitor;

displaying the moved token at the first position in response to the pointing device selecting a cancel-new-schedule option; and determining new start dates and new end dates for other operations in the sequence with the operation represented by the moved token in response to the pointing device selecting an accept-new-schedule option.

15. The method of claim 14, wherein the step of determining new start dates and new end dates comprises the steps of:

determining a new start date and a new end date for each operation later in the sequence than the operation represented by the moved token in response to the pointing device selecting a reschedule-subsequent-operations option;

determining a new start date and a new end date for each operation in the sequence, except the operation represented by the moved token, in response to the pointing device selecting a reschedule-all-operations option;

associating each operation in the sequence for which a new start date and a new end date was determined with a what-if flag in the database in response to the pointing device toggling a reschedule-as-what-if option on;

equating a what-if start date data item and a what-if end date data item for each operation in the sequence associated with a what-if flag to the new start date and the new end date respectively; and equating the start date data item and the end date data item for each operation in the sequence for which a new start date and a new end date was determined to the new start date and the new end date respectively if the operation in the sequence is not associated with a what-if flag.

16. The method of claim 15, further comprising the steps of:

equating the start date data item and the end date data item to the what-if start date data item and the what-if end date data item respectively for each operation in the sequence associated with a what-if flag in response to the pointing device selecting a confirm-what-if option.

deleting the what-if flag for each operation in the sequence associated with a what-if flag in response to the pointing device selecting a discard-what-if option.

17. The method of claim 2, further comprising the steps of:

obtaining a job name from a user input device;

determining a current operation in the sequence for the job, wherein the current operation has a start date data item less than the current date and has an end date data item greater than the current date;

displaying a locator symbol on the shop overview near the graphical representation of the work center represented by the work center data item associated with the current operation; and displaying a production control board showing each operation in the sequence for the job as a token positioned on the time grid according to the start date data item and the end date data item for the operation represented by the token in response to the pointing device selecting the locator symbol.

18. The method of claim 2, further comprising the step of creating a job to schedule, wherein the step of creating a job to schedule comprising the steps of:

displaying a copy of the graphical representation of a work center in a job detail area on the monitor in response to the pointing device moving the graphical representation of the work center from the shop overview into a location in the job detail area;

associating the copy with an operation in the sequence for the job;

creating the work load data item for the operation; and creating a sequence number data item for the operation based on the location of the copy in the job detail area.

19. The method of claim 2, wherein the operation is further represented by an instructional image in the database whereby an operator at the work center scheduled to perform the operation views the image to see how to perform the operation.

20. A system for scheduling job operations and managing work loads on multiple work centers in a manufacturing facility through a visual user interface, comprising:

programmed means for creating a shop overview to graphically represent the work centers in the facility and a work load utilization percentage on each work center;

a display coupled to the programmed means for displaying the shop overview;

a pointing device coupled to the programmed means for selecting a work center graphically represented on the shop overview on the display;

the programmed means for further creating a production control board to graphically represent a schedule for each job operation scheduled for work at the selected work center on the display;

the pointing device for further moving a token shown on the production control board to a new position on the display; and the programmed means for further changing the schedule of the job operation represented by the token based on the new position of the token on the display.

* * * * *